United States Patent
Caldwell

[19]

[11] Patent Number: 5,247,815
[45] Date of Patent: Sep. 28, 1993

[54] TIRE CLAMP FOR PREVENTING THEFT OF A VEHICLE

[76] Inventor: Michael V. Caldwell, 936 Jefferson, Clovis, Calif. 93612

[21] Appl. No.: 870,552

[22] Filed: Apr. 17, 1992

[51] Int. Cl.⁵ .............................................. B62H 5/16
[52] U.S. Cl. .......................................... 70/19; 188/32; 70/226; 70/18; 70/14
[58] Field of Search ........................ 70/14, 18, 19, 225, 70/226, 211, 237, 260; 188/29, 32, 4 R, 5

[56] References Cited

U.S. PATENT DOCUMENTS

| | | | |
|---|---|---|---|
| 1,447,053 | 2/1923 | Trimm | 70/18 |
| 3,423,968 | 1/1969 | Foote | 70/14 |
| 3,855,825 | 12/1974 | Pickard | 70/14 |
| 3,907,072 | 9/1975 | Shafer | 70/226 |
| 4,164,131 | 8/1979 | Desmond et al. | 70/14 |
| 4,175,410 | 11/1979 | Schwaiger | 70/226 |
| 4,723,426 | 2/1988 | Beaudoin | 70/18 |
| 4,768,359 | 9/1988 | Wade | 70/226 |
| 4,819,462 | 4/1989 | Apsell | 70/14 |
| 4,833,442 | 5/1989 | Von Heck | 70/226 |
| 4,854,144 | 8/1989 | Davis | 70/226 |
| 5,040,389 | 8/1991 | Beaudoin | 70/18 |
| 5,134,868 | 8/1992 | Bethards | 70/226 |

*Primary Examiner*—Peter M. Cuomo
*Assistant Examiner*—Darnell M. Boucher

[57] ABSTRACT

A device to be clamped onto a tire which punctures the sidewalls of the tire when an unauthorized attempt is made to move the vehicle or pry the device from the tire. The device includes two jaws that slide toward one another to substantially close around the tire thereby positioning teeth on the jaws close to the sidewalls. The jaws are engaged with a ratchet locket mechanism that permits sliding the jaws together for attachment around the tire but which prevents the jaws from sliding apart unless released with a key. The locking mechanism is protected from tampering by a cover with a hole for inserting the key. The hole is remote from the locking mechanism and the key is elongated providing that cryogenic fluid inserted into the cover hole can not reach the locking mechanism such as might be attempted in an effort to embrittle the locking mechanism.

4 Claims, 1 Drawing Sheet

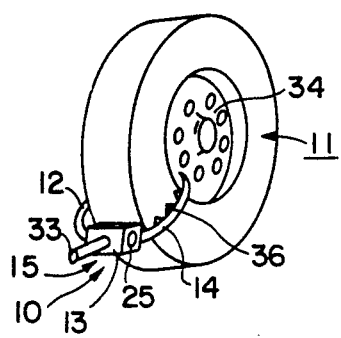
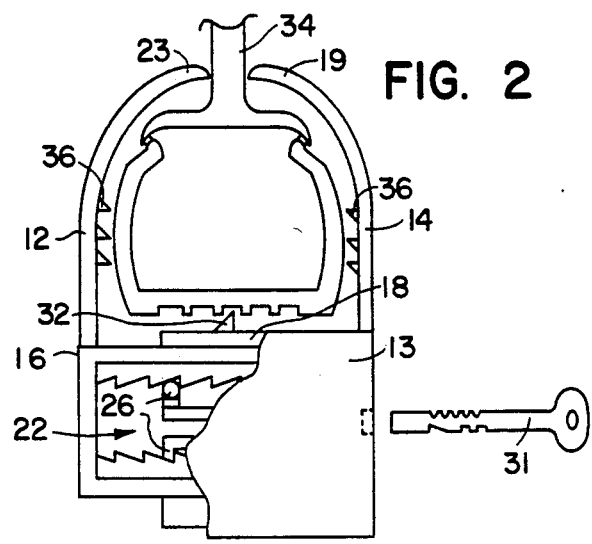
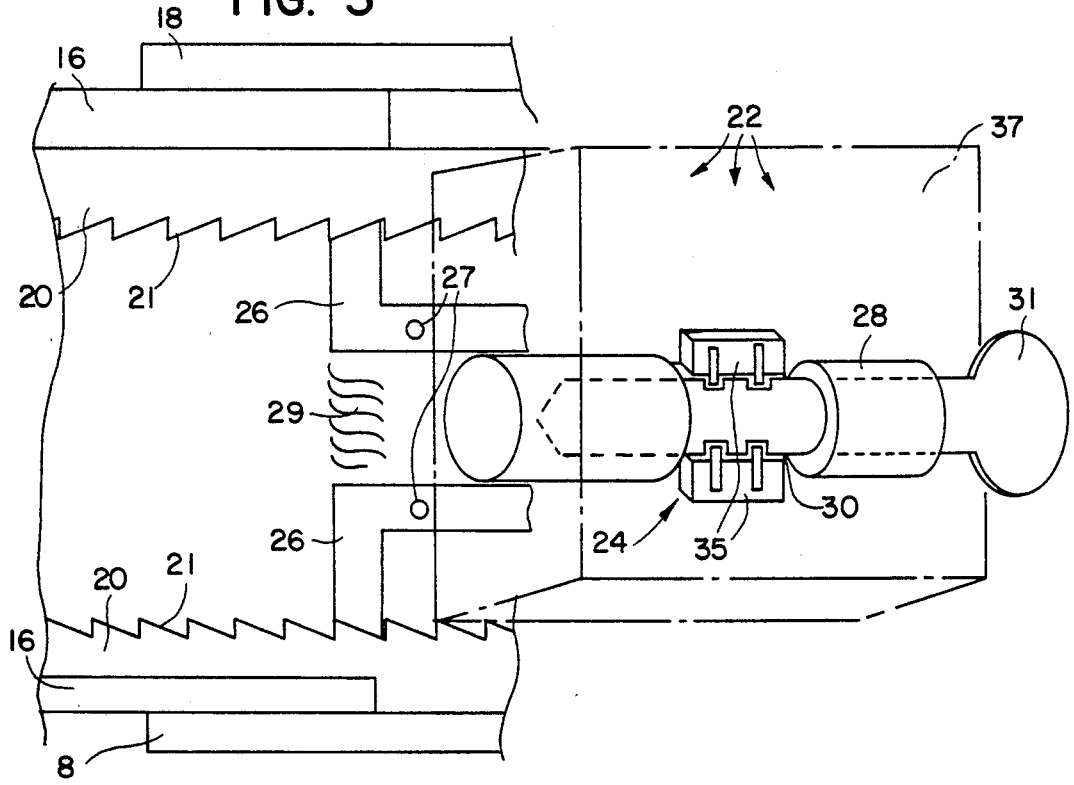
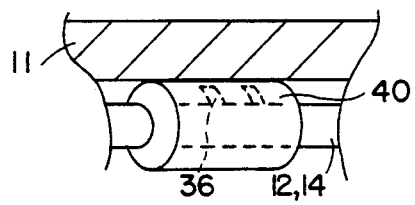

TIRE CLAMP FOR PREVENTING THEFT OF A VEHICLE

BACKGROUND

1. Field of the Invention

This invention relates to devices for preventing auto theft and particularly to a device that locks onto the wheel of an automobile and punctures the tire if the device is moved.

2. Prior Art and Information Disclosure Statement

A number of devices have been disclosed for deterring theft of a vehicle either by sounding an alarm or disabling the vehicle in some manner. Most of these devices are employed inside the vehicle and can therefore be tampered with and defeated in the relative seclusion of the vehicle's interior. Devices have been disclosed for disabling a vehicle by the application of a clamp-like device to one of the vehicle's tires rendering the vehicle difficult to drive. Some of these devices also employ a pointed member which punctures the tire if any attempt is made to move the vehicle. This type of device is effective because it is visible from outside the vehicle and any attempt to defeat it must be done in full view of bystanders. These external devices however are typically heavy, bulky and difficult for the owner to install or remove. In addition, these devices include locking mechanisms which are at least exposed. State-of-the-art criminals are able to freeze the lock using cryogenic liquids an then break them with a few sharp blows of a hammer.

For example, U.S. Pat. No. 3,907,072 to Shafer is for a chock block having a pair of arms for engaging a tire, one of the arms being adjustable and locked in position so that any size tire can be engaged. This device could be pried from the tire with a crowbar. The locking mechanism is located in a position where cryogenic fluid can be readily applied to break the lock.

U.S. Pat. No. 4,164,131 to Desmond et al is for a tire clamp formed of a pair of pivoting arms which may be manually closed and locked upon opposite sides of the tire. The locking mechanism for this device is remote from the tire and configured for easily breaking particularly if cryogenic liquids are applied.

U.S. Pat. No. 4,651,849 to Givati is for a pair of frames pivotally attached to one another providing that combined frames may be positioned with three points of contact around the tire and locked in position. The device can be used for only one tire width.

U.S. Pat. No. 4,854,144 to Davis is for a collapsible lockable frame that engages three locations around the tire. The device has no provisions for accomodating various widths of tires.

U.S. Pat. No. 4,441,586 to Bernier is for a spring-loaded clamp with jaws pivotally attached to one another that can be manually separated to fit around a tire. An adjusting bolt limits degree of pivotal movement of the jaws to accomodate to a range of tire widths and secure the device in position. A strap is hingably attached and padlocked over the bolt to prevent access to the adjustment bolt. This device requires a separate wrench to adjust the bolt. Padlocks are notoriously easy to cut with bolt cutters.

Japanese patent 58-76438 is for a a pair of opposing clamp jaws secured together by a lockable ratchet. One jaw spans across the outside surface of the entire hub of the wheel and the opposing jaw contacts the hub on the inside of the wheel. This arrangement is such that no part of either clamp nor any part of the clamp contacts the tire so that protection against unauthorized movement of the vehicle depends entirely on the difficulty of removing (prying) the device from the tire.

THE INVENTION

OBJECTS

It is an object of this invention to provide a device that prevents theft of the vehicle.

It is another object that the device be attachable to the tire of the vehicle providing that anyone tampering with the device is in view of passersby.

Another object is prevent removal of the device by use of commonly known bolt cutters.

Another object is that the construction of the device be such as to prevent breakage of the device using aforementioned crygenic methods.

Another object is that, with the device attached, any attempt to move the vehicle or to pry the device off the tire will result in destruction of the tire thereby thwarting the attempt to steal the vehicle.

SUMMARY

In one embodiment, the device of this invention includes two vise-like jaws which are slidably engaged with one another providing that the jaws may be attached around a tire with tips of the jaws in close proximity to the hub. The jaws are secured in place with a ratcheting lock assembly which is released with a special key. The entire lock mechanism is enclosed within a metal cover to prevent tampering. Provision has been made for any cryogenic liquids injected into the keyhole to drain out before reaching the lock mechanism. The device also has metal teeth which will puncture the sidewall of the tire if any attempt is made to move the vehicle with the device attached or to pry the device off the tire.

BRIEF DESCRIPTION OF THE DRAWINGS

FIG. 1 shows the tire clamp of this invention clamped around a tire.

FIG. 2 shows the tire clamp of FIG. 1 in greater detail.

FIG. 3 shows details of the lock for the tire clamp.

FIG. 4 shows a shield over the teeth of the tire clamp.

DESCRIPTION OF THE PREFERRED EMBODIMENT

The following paragraphs present variations of the invention including what I presently believe is the best mode for carrying out the invention.

Turning now to a discussion of the drawings, there is shown in FIG. 1 the device 10 of this invention clamped on a tire 11. The device 10 includes a pair of jaws 12 and 14 joined by a joining mechanism 15.

The device is shown in greater detail in FIG. 2 in which a cover 13 has been cutaway to show inner details of the joining mechanism 15. The jaws are supported opposed to one another by a first sliding member 16 supporting first jaw 12 slidably engaged with a second sliding member 18 supporting second jaw 14. Details of a means for locking the sliding members 16 and 18 are shown to greater advantage in FIG. 3.

The jaws may be slid toward one another to a spacing from one another determined by the width of the tire. A pair of ratchet bars 20 are shown attached to first sliding member 16. The ratchet bars are engaged with a locking mechanism 22 attached to second sliding member 18. Locking mechanism 22 includes ratchet detentes 26 pivotally supported at location 27 by a lock body 37 shown in phantom in FIG. 3. The detentes 26 are biased by spring 29 to engage the teeth 21 of the ratchet bars 20. The angle of the ratchet teeth 21 with respect to the detente 26 permits the jaws 12 and 14 to only slide toward one another when the detents are engaged with the ratchet bars. In order to separate the jaws, a special elongated key 31 must be inserted through a spacer tube 28 into the keyhole 30 between tumblers 35. The spacer tube 28 requiring the key 26 to be elongated provides that crygenic fluid poured into the keyhole 32 will not reach the ratchet 20 and detente 26 thereby preventing a wouldbe thief from freezing and breaking open the locking mechanism.

To install the device on the tire 11, the user positions the device with the tire 11 between the two jaws 12 and 14 and slides the jaws together until the tip 19 and 23 of each jaw comes into closest proximity with the center of the wheel 34. The ratchet mechanism prevents the jaws from then sliding apart unless the jaws are released by the key.

Teeth 36 on jaws 12 and 14 face toward the sidewall 13 of tire 11 and are angled in oppositon so that at least one tooth will puncture the sidewall of the tire 11 if an attempt is made to move the vehicle in either direction. The teeth 36 are also angled so as to puncture the sidewall of the tire in the event an attempt is made to forcibly pry the device from the tire.

In the embodiment described in the foregoing paragraphs, the jaws are closed to where the tips 23 and 19 of the jaws are actually in contact with or close to the center of the wheel so that the teeth are in proximity to the sidewall 13. In this embodiment, the clamp is loosely attached to the wheel. FIG. 4 shows another embodiment in which a resilient cushion 40 is positioned around the teeth 36. (In FIG. 4, the teeth are shown in phantom and the tire 11 and clamps 12 and 14 are cut away.) The cushion 40 is sufficiently firm to provide that the surface of the cushion 40 is brought snugly into contact with the sidewall 13 but not so forcibly that the teeth 36 will penetrate the cushion 40 and sidewall 13. If the vehicle is then moved, the additional force on the device will cause the teeth 36 to penetrate the cushion 40 and puncture the sidewall 13.

FIG. 2 shows another embodiment in which additional spikes 32 may be mounted on at least one of the sliding members 16 and 18 where they are in position to puncture the tread of the tire if the vehicle is moved.

Refering to FIG. 1, in order to detach the device 10 from the tire 11, the user grasps the handle 33 and inserts the key 26 through a hole in the cover 13 into the key hole 30 and turns the key 26 to release the locking mechanism 22 permitting the jaws 12 and 14 to be slid apart.

Locking mechanism 22 and sliding members 16 and 18 are enclosed in a cover 13 for protection against tampering and the weather. Lock 24 is recessed well within the cover and spaced from the cover hole 25 providing that any cryogenic liquid inserted into the cover hole 25 will drain away and evaporate before reaching the locking mechanism 22.

In the foregoing paragraphs, a device which prevents unauthorized movement of a vehicle has been described which meets the objects of the invention. The design of each jaw mounted on a sliding member eliminates the need of a chock block and therefore provides the convenience of being able to mount the device anywhere around the tire and is less cumbersome than a design incorporating a chock block. The mounting of each jaw on a sliding mechanism ratchetted together is inherently stronger than clamps pivotally secured to one another since only the pivot pin need be broken or withdrawn such as with a hand drill to separate the jaws. Contact of the jaws to various areas of the tire rather than hub provides that teeth can be mounted on the jaws so that if sufficient force is exerted on the jaws in attempting to pry the device from the vehicle or if the vehicle is moved, the tire will be punctured thereby immobilizing the vehicle. The embodiments of this invention therefore avoid the shortcomings of the devices described in the Background.

The crux of the invention is a device which punctures the sidewalls of a tire of a vehicle to which it is attached if the vehicle is moved or if an attempt is made to pry the device from the tire. This is accomplished by a plurality of teeth supported adjacent to the sidewall by jaws which are slidably joined together and secured in the required position by a lockable ratchet arranged to prevent exposure to cryogenic fluid. Other embodiments embracing these principles are within the scope of this invention. I therefore wish to define my invention by the scope of the appended claims and in view of the specification if need be.

I claim:

1. A device to be attached substantially around a tire of a wheel of a vehicle to prevent theft of the vehicle wherein said tire has sidewalls and a tread with a width, said device comprising:

a sliding means adapted for attaching said device to said tire including a first sliding member slidably mounted on a second sliding member;

a first jaw having a first mounting end mounted on said first sliding member and a first tip end;

a second jaw having a second mounting end mounted on said second sliding member and a second tip end;

said first and second jaws and said first and second sliding members constructed in operable combination with one another to provide that said first tip end and said second tip end be separated from one another by a selected distance that is variable between a value greater than and a value less than said tread width;

a ratchet bar member with notches and attached to said first sliding member;

a lock body member attached to said second sliding member;

a spring loaded detent means attached in said lock body member in operable combination with said ratchet bar member for engaging said notches and permit said first and second jaws to slide toward one another but prevent said first and second jaws from sliding away from one another;

a key barrel means with a keyhole and rotatably mounted in said lock body member and engaging said detent means for disengaging said detent means from said notches when said key barrel means is rotated thereby permitting said first and second jaws to slide away from one another;

a key means for turning said key barrel means by turning said key means inserted into said keyhole;

a cover which encloses said ratchet bar means, said lock body member, said detent means and said key barrel means, said cover having an entry hole positioned with a spacing between said entry hole and said keyhole;

a spacing tube located in said spacing and having a length selected to prevent cryogenic fluid inserted into said entry hole from reaching said lock body member;

teeth members attached to at least one of said first and second jaws facing said sidewall of said tire when said jaws have been placed substantially around said tire providing that when said jaws are locked around said tire with said tip ends separated by a distance less than said tire width, said teeth member are positioned for puncturing said tire if said vehicle is moved or an attempts made to pry said device from said tire.

2. A device as in claim 1 wherein said ratchet bar member comprises:

a pair of parallel ratchet bars, each having an end secured to said first sliding member and each having said plurality of notches; and said detent means comprising two detents mounted between said ratchet bars in said lock body member substantially, each detent having a detent end proximal to one of said ratchet bars, for engaging to and disengaging from said ratchet bars;

a spring between said detents biasing each detent end toward said respective ratchet bar;

each detent end configured in operable combination with said notches to permit said first jaw means to slide freely toward said second jaw member and prevent said first jaw member from sliding away from said second jaw member when said pin ends engage said notches.

3. A device to be attached substantially around a tire of a wheel of a vehicle to prevent theft of the vehicle wherein said tire has sidewalls and a tread with a width, said device comprising:

a sliding means adapted for attaching said device to said tire including a first sliding member slidably mounted on a second sliding member;

a first jaw having a first mounting end mounted on said first sliding member and a first tip end;

a second jaw having a second mounting end mounted on said second sliding sliding member and a second tip end;

said first and second jaws and said first and second sliding members constructed in operable combination with one another to provide that said first tip end and said second tip end be separated from one another by a selected distance that is variable between a value greater than and a value less than said tread width;

means for locking said sliding means such as to prevent said tip ends positioioned at said selected distance from sliding away from one another;

teeth member attached to at least one of said first and second jaws facing said sidewall of said tire when said jaws have been placed substantially around said tire providing that when said jaws are locked around said tire with said tip ends separated by a distance less than said tire width, said teeth member is positioned for puncturing said tire if said vehicle is moved or an attempt is made to pry said device from said tire;

said teeth member having a plurality of teeth, each tooth having an end attached to one of said respective jaws;

a resilient cushion having an outer surface and substantially surrounding said plurality of teeth providing that when said jaws substantially around said tire are slid toward one another, said surface of said cushion comes into supportive contact with said sidewall and protects said sidewall from damage by said teeth and when said vehicle is moved or an attempt is made to pry said device from said tire, said pluality of teeth will extend through said cushion and puncture said tire.

4. A device as in claim 3 which comprises teeth members positioned on said sliding means facing said tread.

* * * * *